(12) United States Patent
Fraval et al.

(10) Patent No.: US 10,005,547 B2
(45) Date of Patent: Jun. 26, 2018

(54) AIRCRAFT UNDERCARRIAGE WITH SHIMMY-DAMPING MEANS

(71) Applicant: MESSIER-BUGATTI-DOWTY, Velizy-Villacoublay (FR)

(72) Inventors: Jerome Fraval, Velizy-Villacoublay (FR); David Frank, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 163 days.

(21) Appl. No.: 15/151,593

(22) Filed: May 11, 2016

(65) Prior Publication Data

US 2016/0332726 A1 Nov. 17, 2016

(30) Foreign Application Priority Data

May 12, 2015 (FR) ..................................... 15 54229

(51) Int. Cl.
*B64C 25/58* (2006.01)
*B64C 25/50* (2006.01)
(Continued)

(52) U.S. Cl.
CPC ............ *B64C 25/505* (2013.01); *B64C 25/34* (2013.01); *B64C 25/58* (2013.01); *F16F 9/12* (2013.01); *F16F 9/182* (2013.01)

(58) Field of Classification Search
CPC ......... B64C 25/32; B64C 25/34; B64C 25/50; B64C 25/58; B64C 25/60; B64C 25/505; F16F 9/12; F16F 9/182
See application file for complete search history.

(56) References Cited

U.S. PATENT DOCUMENTS 2,366,697 A 1/1945 Bound
3,056,598 A 10/1962 Conway et al.
(Continued)

FOREIGN PATENT DOCUMENTS

| EP | 0246949 A1 | 11/1987 |
|---|---|---|
| GB | 555500 A | 8/1943 |
| GB | 2482154 A | 1/2012 |

OTHER PUBLICATIONS

International Search Report from the French Republic National Industrial Property Institute dated Dec. 15, 2015 in counterpart application No. FR 1554229.
(Continued)

*Primary Examiner* — Richard G Davis
(74) *Attorney, Agent, or Firm* — Sughrue Mion, PLLC

(57) ABSTRACT

The invention relates to an aircraft undercarriage comprising: a strut (1) for connecting to the aircraft, a slide rod (3) slidably engaged in leaktight manner in the strut via the bottom opening, which rod carries at least one wheel at its bottom end, a diaphragm (7) carried by a support (8) attached to the top wall of the strut to cooperate in leaktight manner with an inside wall of the slide rod so as to define a first chamber (C1) under the diaphragm inside the rod and completely filled with hydraulic fluid, and a second chamber (C2) above the diaphragm and partially filled with hydraulic fluid, a throttle needle (10) secured to the slide rod and penetrating into a calibrated orifice (12) in the diaphragm so as to define a calibrated fluid passage between the first and second chambers, and angular connection means for imposing an angular position on the slide rod relative to the strut. According to the invention, the undercarriage includes at least one vane (20) fastened to the end of the throttle needle in order to extend inside a portion of the second chamber that is filled with hydraulic fluid.

3 Claims, 2 Drawing Sheets

(51) Int. Cl.
*B64C 25/34* (2006.01)
*F16F 9/12* (2006.01)
*F16F 9/18* (2006.01)

(56) References Cited

U.S. PATENT DOCUMENTS 4,749,152 A * 6/1988 Veaux ................ B64C 25/60
188/321.11
4,940,197 A * 7/1990 Putnam ............... B64C 25/34
244/102 R

OTHER PUBLICATIONS

Written Opinion issued from the French Republic National Industrial Property institute dated May 12, 2015 in counterpart application No. FR 1554229.—concise statement is the Search Report.

* cited by examiner

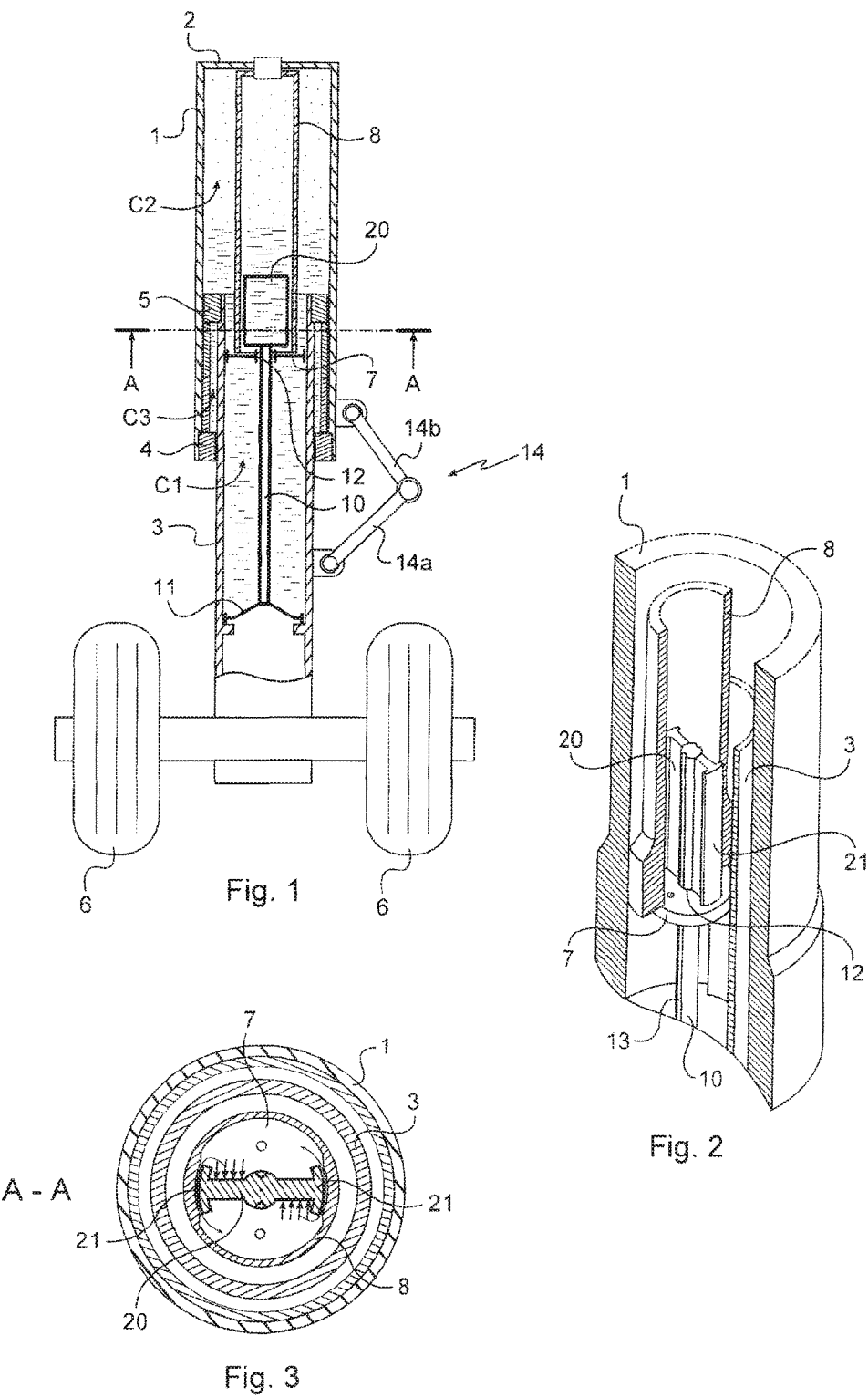

AIRCRAFT UNDERCARRIAGE WITH SHIMMY-DAMPING MEANS

The invention relates to an aircraft undercarriage with shimmy-damping means.

TECHNOLOGICAL BACKGROUND OF THE INVENTION

Undercarriages are known that comprise a strut having a slide rod mounted to slide telescopically therein. The bottom end of the slide rod carries an axle or a bogey for receiving one or more wheels. Suspension means are formed between the strut and the slide rod in order to absorb impacts during landing and in order to suspend the aircraft while it is taxiing.

In general, the rod is connected to the strut by a scissors linkage having branches that allow the rod to be pushed freely into the strut while preventing the slide rod from turning in the strut. For undercarriages provided with means for steering the wheels, the scissors linkage is not connected directly to the strut, but rather to a member that is pivotally mounted on the strut (such as an external collar mounted to turn around a bottom portion of the strut, or indeed a tube that is mounted to turn inside the strut). The angular position of the pivotal member is controlled by a hydraulic or electric steering control that acts via the compass linkage to impose an angular position on the slide rod, and thus on the wheels.

It is known that undercarriages are subject to oscillations, referred to as "shimmy", that result in particular from coupling between bending and twisting modes of the undercarriage. Such oscillations fatigue the undercarriage and can lead to situations that become catastrophic in the event of entering into resonance. Various means are known for damping these oscillations, such as for example providing anti-shimmy check valves in the hydraulic steering controls, or shimmy dampers on the hinge of the scissors linkage.

OBJECT OF THE INVENTION

An object of the invention is to propose an aircraft undercarriage that is provided with an alternative system for damping shimmy, which system is purely passive.

SUMMARY OF THE INVENTION

In order to achieve this object, there is provided an aircraft undercarriage comprising:
- a strut for connecting to the aircraft and defining a substantially cylindrical cavity closed by a top wall and presenting a bottom opening;
- a slide rod slidably engaged in leaktight manner in the strut via the bottom opening, which rod carries at least one wheel at its bottom end;
- a diaphragm carried by a support attached to the top wall of the strut to co-operate in leaktight manner with an inside wall of the slide rod so as to define a first chamber under the diaphragm inside the rod and completely filled with hydraulic fluid, and a second chamber above the diaphragm and partially filled with hydraulic fluid;
- a throttle needle secured to the slide rod and penetrating into a calibrated orifice in the diaphragm so as to define a calibrated fluid passage between the first and second chambers; and
- angular connection means for imposing an angular position on the slide rod relative to the strut.

According to the invention, the undercarriage includes at least one vane fastened to the end of the throttle needle in order to extend inside a portion of the second chamber that is filled with hydraulic fluid.

Thus, if twisting oscillations develop during which the slide rod oscillates angularly inside the strut, in particular because of the flexibility of the angular connection means, the vane begins to oscillate angularly in the hydraulic fluid, thereby generating an opposing torque on the vane that contributes to damping these oscillations, and that contributes to countering any tendency of the undercarriage to shimmy. This opposing torque, due to viscous friction generated by the vane moving angularly in the fluid, is generated automatically and in purely passive manner.

For undercarriages in which the angular connection means between the slide rod and the strut include controllable steering, this damping is available even when the steering control is inactive, e.g. as a result of a power supply failure in the steering control.

Preferably, the vane has edges that extend facing an inside wall of the support in order to cooperate therewith to present clearance that is small, at least when the wheels of the undercarriage are in position for the aircraft to taxi in a straight line.

BRIEF DESCRIPTION OF THE FIGURES

The invention can be better understood in the light of the following description of a particular embodiment of the invention, given with reference to the figures of the accompanying drawings, in which:

FIG. 1 is a diagrammatic section view of an aircraft undercarriage of the invention;

FIG. 2 is a partially cutaway perspective view of the FIG. 1 undercarriage;

FIG. 3 is a section view on line A-A of FIG. 1, showing the vane and the tubular diaphragm of the FIG. 1 undercarriage.

DETAILED DESCRIPTION OF AN EMBODIMENT OF THE INVENTION

Figure 4:
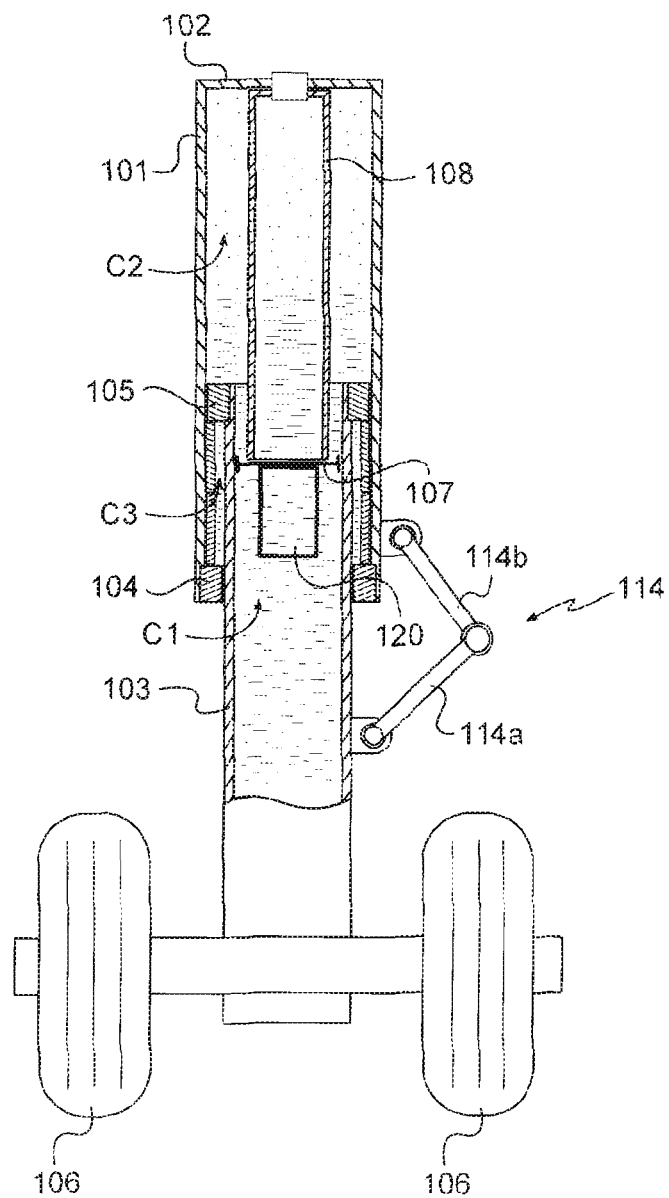
FIG. 4 is a view analogous to FIG. 1 showing a variant embodiment of the invention.

With reference to the figures, a typical aircraft undercarriage generally comprises a strut 1 connected to the structure of the aircraft and defining a cylindrical cavity closed by a top wall 2 and presenting an opening at its bottom end. A slide rod 3 is slidably engaged in leaktight manner in the strut 1 via its bottom opening. To do this, the strut 1 carries a bottom bearing 4 against which an outside wall of the slide rod 3 slides, and the slide rod 3 carries a movable top bearing 5 that slides against an inside wall of the strut 1. In this example, the bottom end of the slide rod 3 carries two wheels 6. Furthermore, a diaphragm 7 is carried by a support 8 that is fastened to the top wall 2 of the strut 1. Inside of the slide rod 3, the diaphragm 7 defines a first chamber C1 filled with hydraulic fluid. A second chamber C2 extending inside the slide rule 3 and the strut 1 above the diaphragm 7 is partially filled with hydraulic fluid, the remainder of the second chamber C2 being filled with gas under pressure. A third chamber C3 filled with hydraulic fluid extends between the slide rod 3 and the strut 1, between the bearings 4 and 5. A calibrated passage (not shown) is provided through the top bearing 5 to put the chambers C2 and C3 into fluid flow communication with each other. A throttle needle 10 carried by a needle support 11 secured to the slide rod 3 extends through a calibrated orifice 12 in the diaphragm 7. In known manner, the throttle needle 10 includes longitudinally extending grooves 13 of varying depth that serve to vary the fluid flow section between the chambers C1 and C2 as a function of the extent to which the slide rod 3 is pushed into the strut 1.

In known manner, the undercarriage is fitted with a device for controlling the angular position of the slide rod 3 relative to the strut 1, e.g. a scissors linkage 14 having branches 14a and 14b that are hinged to each other and that are hinged respectively to the slide rod 3 and to the strut 1. In undercarriages with steerable wheels, the top branch 14b of the scissors linkage is not hinged directly to the strut 1, but rather to a pivot member that is pivotally mounted on the strut, such as a collar that is mounted to turn about the strut, or a tube that is mounted to turn inside the strut, with the angular position thereof being controlled by steering control means. This is all well-known and is mentioned only to situate the context of the invention.

According to the invention, a vane 20 is fastened to the end of the throttle needle 10 in order to extend inside the support 8, in a portion of the second chamber C2 that is filled with hydraulic fluid. During twisting oscillations of the undercarriage during which the slide rod 3 oscillates angularly inside the strut 1, in particular because of the flexibility of the scissors linkage 14, the vane 20 oscillates angularly in the hydraulic fluid in which it is immersed, thereby generating an opposing torque on the vane 20 due to viscous friction that acts via the throttle needle 10, tending to damp the angular oscillations of the slide rod 3 in the strut 1. This produces damping that is internal to the undercarriage, that is purely passive, and that is available even if the steering control is not active.

According to a particular aspect of the invention, as shown in FIG. 3, when the wheels 6 (not shown in FIG. 3) are in position for taxiing in a straight line (which always applies for undercarriages without steering control, and which applies for undercarriages with steering control when they are in a neutral position), the edges 21 of the vane 20 extend facing an inside wall of the support 8 with small clearance that is small and suitable for obtaining greater damping. Preferably, the edges 21 of the vane 20 are in the form of respective cylindrical sectors, each having its outside wall facing the inside wall of the support 8 with clearance that is small.

In a variant embodiment shown in FIG. 4, the undercarriage does not have a throttle needle, and the vane 120 is fastened to the diaphragm 107 in order to extend inside the first chamber C1. Likewise, during twisting oscillations of the undercarriage during which the slide rod 103 oscillates angularly inside the strut 101, in particular because of the flexibility of the compass linkage 114, the vane 120 oscillates angularly in the hydraulic fluid in which it is immersed, thereby generating an opposing torque on the vane 120 due to viscous friction that acts via the diaphragm 107, tending to damp the angular oscillations of the slide rod 103 in the strut 101. This produces damping that is internal to the undercarriage, that is purely passive, and that is available even if the steering control is not active.

The invention claimed is:

1. An aircraft undercarriage comprising:
   a strut (1) for connecting to the aircraft and defining a substantially cylindrical cavity closed by a top wall (2) and presenting a bottom opening;
   a slide rod (3) slidably engaged in leaktight manner in the strut via the bottom opening, which rod carries at least one wheel at its bottom end;
   a diaphragm (7) carried by a support (8) attached to the top wall of the strut to co-operate in leaktight manner with an inside wall of the slide rod so as to define a first chamber (C1) under the diaphragm inside the rod and completely filled with hydraulic fluid, and a second chamber (C2) above the diaphragm and partially filled with hydraulic fluid;
   a throttle needle (10) secured to the slide rod and penetrating into a calibrated orifice (12) in the diaphragm so as to define a calibrated fluid passage between the first and second chambers; and
   angular connection means for imposing an angular position on the slide rod relative to the strut;
   the undercarriage being characterized in that it includes at least one vane (20) fastened to the end of the throttle needle in order to extend axially along the support (8) and inside a portion of the second chamber that is filled with hydraulic fluid.

2. An undercarriage according to claim 1, wherein the vane (20) has edges (21) that extend facing an inside wall of the support (8), at least when the wheel of the undercarriage is in position for the aircraft to taxi in a straight line.

3. An undercarriage according to claim 2, wherein the edges (21) are in the form of cylindrical sectors presenting outside walls that extend facing an inside wall of the support (8).

* * * * *